June 8, 1954 G. P. BURNS ET AL 2,680,834
TESTING APPARATUS
Filed Aug. 21, 1950
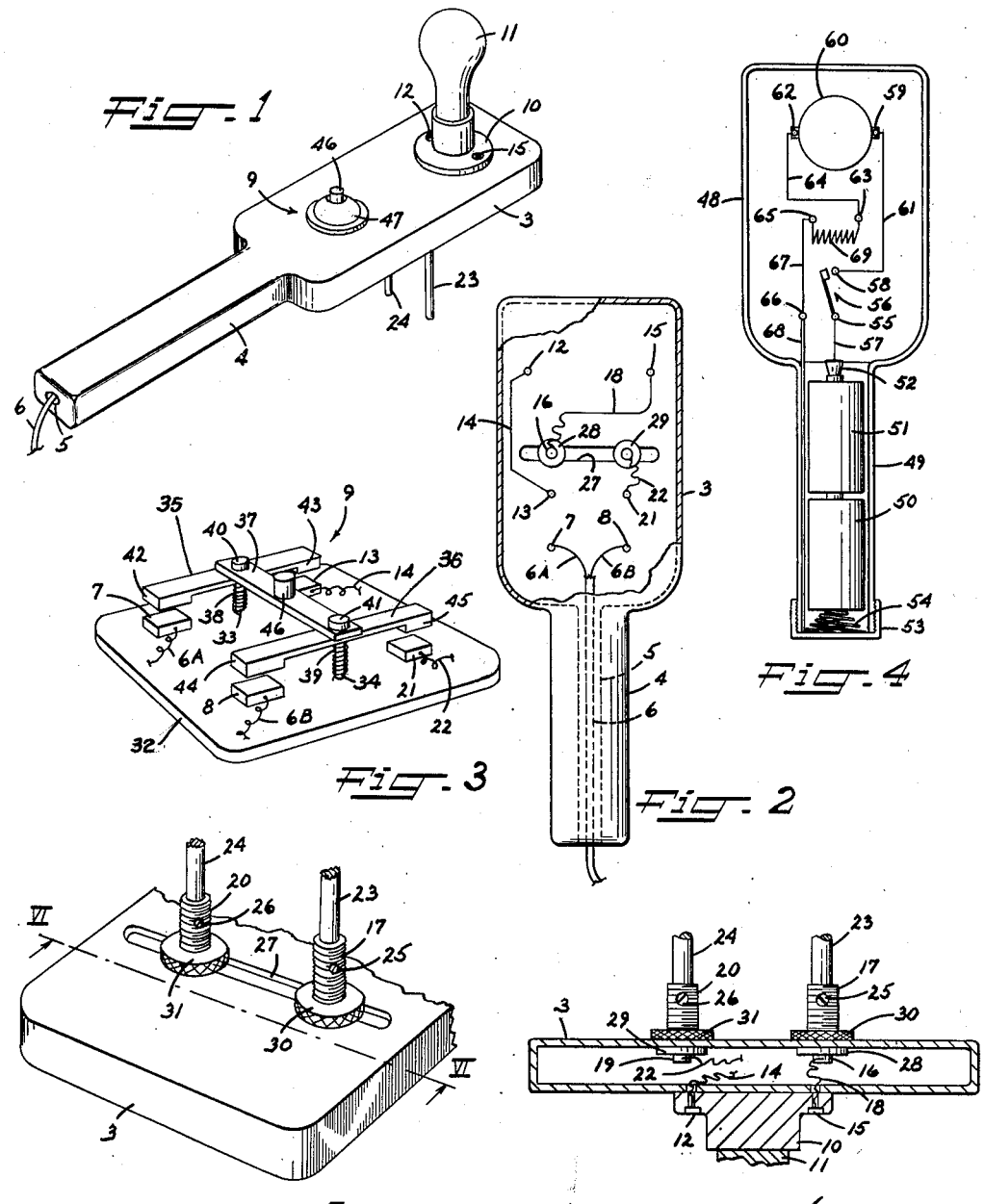
INVENTORS.
GROVER P. BURNS
HUBERT C. SHULL
BY
ATTORNEY.

Patented June 8, 1954

2,680,834

UNITED STATES PATENT OFFICE 2,680,834

TESTING APPARATUS

Grover P. Burns and Hubert C. Shull, Fredericksburg, Va.

Application August 21, 1950, Serial No. 180,604

1 Claim. (Cl. 324—30)

The present invention relates to a testing device or apparatus. More particularly the invention relates to a portable electrical apparatus for the testing of electrical conductivity of liquids, and the like.

Various devices are known in the art for testing the electric conductivity of liquids. These devices, for the most part, however, are large and bulky and not easily moved from one place to another. They are usually left permanently in one place and liquids or solutions to be tested are carried to the device. Further, because of the large current passing through the electrodes, and the large difference of potential between them, one must be careful to avoid touching the same, hence cleaning of the electrodes, which is necessary after testing each solution, is both bothersome and dangerous in that the electric current must be shut off each time before cleaning begins in order to avoid a shock.

Under certain circumstances, such as in classroom demonstrations, and the like, where a large number of solutions are to be tested and time is of the essence, existing commercial conductivity testing devices are cumbersome, awkward to handle, and as a result inefficient for the purpose.

We have now found and devised a conductivity testing device which overcomes the aforementioned difficulties and is portable, capable of being easily handled and alleviates any danger of shock when the electrodes are being cleaned.

Accordingly, it is an object of the present invention to provide a portable conductivity testing device which is simple in construction and easily handled.

It is another object of the invention to provide a portable conductivity tester which alleviates any danger of shock when cleaning the electrodes.

It is another object of the invention to provide a portable conductivity tester having a source of electromotive force enclosed within the tester.

It is another and specific object of the invention to provide a portable conductivity tester or testing device having means for readily replacing the electrodes and means for moving the electrodes relative to one another.

Other objects and advantages of the present invention will in part be obvious and will in part appear from the description thereof hereinafter.

In general the objects of the present invention are accomplished by providing a paddle-like base having a handle attached thereto. Mounted on the base is a lamp or current measuring instrument connected in series with one of two electrodes, the electrodes being connected to a source of electromotive force through a switch which is preferably of the double or dipole type. The source of electromotive force may be either a D. C. or an A. C. generator, or, in certain instances, batteries, or the like.

For a more detailed description of the present invention, reference should be had to the accompanying drawing which is merely intended to be illustrative and not limitative and in which—

Figure 1 is a perspective view of one embodiment of the invention,

Figure 2 is a plan view of the embodiment shown in Figure 1 partly cut away to show the electrical connections therein, Figure 3 is a perspective view of the internal portion of the switch, Figure 4 is a diagrammatic view of another embodiment of the invention, Figure 5 is a perspective view of the underside of the base of the embodiment shown in Figure 1 showing the means for connecting and moving the electrodes, and Figure 6 is a side elevation, partly in section, taken along the line VI—VI in Figure 5.

Referring to Figures 1 and 2, the conductivity tester comprises a base 3, which preferably is hollow, made of a strong insulating material, such as wood, plastic, fiiber board, and the like, having a handle 4 extending outwardly therefrom and integrally attached thereto. Coincident with the axis of the handle is an elongated opening 5 through which passes an electric conductor or cord 6, which terminates at or is fastened to terminals 7 and 8 by conductors 6A and 6B of the double or dipole push button switch 9, described hereinafter. The electric conductor 6, comprising the two wires 6A and 6B, is attached to a suitable power source (not shown).

Fastened to one face of the hollow paddle-like base 3 is a standard lamp socket 10, the dipole switch 9 being fastened to the same face between the lamp socket and handle and at such a distance that the switch is easily reached with the thumb when grasping the handle. An electric lamp bulb 11 is screwed into socket 10. Terminal 12 of the lamp socket is connected to terminal 13 of the dipole switch by the lead line or conductor 14.

Referring now to Figures 5 and 6, in addition to Figures 1 and 2, terminal 15 of the lamp socket 10 is connected to terminal 16, fastened to the electrode receptacle or binding post 17, by conductor 18. A second terminal 19, fastened to the electrode receptacle 20, is connected to terminal 21 of the dipole switch 9 by conductor 22.

The electrodes 23 and 24 are inserted in the receptacles or binding posts 17 and 20 and held in place therein by set screws 25 and 26. The electrodes extend outwardly and preferably at right angles to the opposite side of the base to which the lamp socket is attached. Any other suitable means, such as a spring clamp, and the like, may be employed to hold the electrodes in position. The receptacles 17 and 20 are slidably mounted in the elongated slot or opening 27 on the opposite side of base 3 to which the lamp socket and switch are attached.

The electrode receptacles 17 and 20 are held in place in the slot 27 on the underside of the base 3 by washer-like members 28 and 29 integrally attached to receptacles 17 and 20 respectively, adjacent to terminals 16 and 19. The members 28 and 29 are slightly larger than the width of the elongated slot 27. In addition to members 28 and 29 the receptacles are threaded and locked in position by the knurled lock-nuts 30 and 31. To move the receptacles one has to merely unscrew the lock-nuts, move the receptacles, and then retighten the lock-nuts. The versatility of the conductivity tester is thus greatly increased since in testing some solutions, in order to obtain the best results, it is necessary that the electrodes be closer together than in testing other solutions. In addition the electrodes are readily interchangeable which is necessary since, for example, when using copper electrodes some solutions will react with the electrodes and damage them. Thus in testing a series of solutions, as in a classroom demonstration, the electrodes may be readily changed and also readily adjusted. Various type electrodes may be employed, such as those made from copper, steel, platinum, silver, and other metals well known in the art.

Referring to Figure 3, which shows the internal structure of the dipole switch 9, the switch comprises a base 32 having four metallic contacts or terminals 7, 8, 13, and 21 positioned thereon, to which are connected lead lines or conductors 6A, 6B, 14, and 22. Extending upward from either side of switch base 32 are posts or rods 33 and 34 which are preferably made of some suitable non-conductive material, such as plastic, wood, and the like. The posts extend upward through openings in the strips or bars 35 and 36, which are made of conductive material, such as steel, copper, and the like, and also through openings in the ends of the cross or supporting bar 37, which is made of a non-conductive material, such as Bakelite and the like. Bar 37 is rigidly attached to bars 35 and 36 and at right angles thereto with the openings in said bars coinciding.

The posts 33 and 34 have compression springs 38 and 39 encircling them on which rest the bars 35 and 36, the same being pushed upward by the springs against the screw caps 40 and 41 on posts 33 and 34 respectively. Extending downwardly from the ends of bar 35 are projections 42 and 43 and from the ends of bar 36, projections 44 and 45. Extending upwardly from the center of the cross or supporting bar 37 is a cylindrical projection or button 46. The button protrudes upward out of an opening in the casing 47 which encloses or houses the switch assembly (see Figure 1).

When the button 46 is pushed down, bars 37, 35, and 36 are forced downward causing projections 42, 43, 44, and 45 to contact terminals 7, 13, 8, and 21 respectively thus completing the circuit from the power source, through conductor 6A, bar 35, conductor 14, through lamp 11, conductor 18, electrode 24, through the solution in which the electrodes are placed, if the solution is a conductor, to electrode 23, through conductor 22, through bar 36, and conductor 6B back to the power source. When pressure is released on button 46, the springs 38 and 39 push the bars 35 and 36 up out of contact with the dipole switch terminals, thus breaking the circuit on both sides of the line and preventing the electric current from proceeding any further than terminals 7 and 8. Thus when the switch is deenergized the electrodes may be cleaned without fear of shock and also replaced with other electrodes if necessary.

The conductivity tester is easily handled in one hand and easily and rapidly transferred from one solution to another which are placed in suitable containers. After placing or holding the electrodes in the solution the button on the switch is pressed down to close the circuit and if the solution is conductive the bulb will light up with an intensity depending upon the amount of current passing therethrough. If desired a current measuring instrument may be employed in place of the lamp or bulb 11 to indicate quantitatively the flow of current. For demonstrative purposes, such as in a classroom, the lamp is sufficient.

Referring to Figure 4 there is shown another embodiment of the present invention. This embodiment comprises a hollow paddle-like base 48 having a hollow handle 49 integrally attached thereto. It should of course be understood that the base and handle, as well as the electrodes, may be of any desired shape and size depending upon the range of conductivity of the solutions and the size of the containers used for the solutions to be tested.

The hollow handle contains dry cells 50 and 51 which are held tightly against each other and against the metallic contact or terminal 52 by means of a screw cap 53 which contains a compression spring 54 which in turn presses against cell 50 when the cap is screwed on.

Terminal 52 is connected to terminal 55 of a single pole push button switch 56 by a conductor 57. The second terminal 58 of switch 56 is connected to terminal 59 of the lamp socket 60 by lead line or conductor 61. Terminal 62 on the lamp socket is connected to the electrode receptacle terminal 63 by conductor 64 and the electrode receptacle terminal 65 is connected to terminal 66 by conductor 67. Terminal 66 is connected to a metallic strip 68 which runs along the inside of the handle 49 to make contact with cell 50 through spring 54, as shown, or the last cell if more than two are employed. Also, only one cell may be employed, if desired, depending of course upon the conductivity of the solutions being tested.

When the push button switch 56 is closed the circuit is completed, provided the electrodes are in a conductive solution, from the power source, cells 50 and 51, through line 57 and switch 56, line 61, lamp socket 60 and lamp 11, line 64 to the electrode receptacle terminal 63 and through the electrode fastened therein, through the solution being tested, then through the electrode fastened in the receptacle to which terminal 65 is attached, through line 67, and then through the metallic strip 68 back to the cells or power source.

It should be noted that a resistance 69 is placed between the terminals 63 and 65 fastened to the electrode receptacles. This is necessary in some instances. For example, when using two dry cells (D size) and an ammeter (0–3 amperes) in place of the bulb and no resistance across the electrodes, readings from 0–1 ampere are obtained when testing solutions of copper sulfate, zinc sulfate, sodium chloride, and also water. When testing these solutions using the same cells but a 3–6 volt bulb in place of the ammeter and no resistance, water will not make the bulb glow. However, the bulb will glow when a resistance of 40 ohms is placed across the electrodes. The resistance of course may be varied depending upon conditions.

In the embodiment shown in Figure 4 the electrodes are fastened in electrode receptacles such as shown in Figures 5 and 6. The embodiment shown in Figure 4 is advantageous in that it is completely portable, having its own source of electromotive force in the handle, and it may be used anywhere. It is particularly useful for testing the conductivity of solutions in the field.

The present invention provides a conductivity tester which is simple in construction, portable and economically advantageous. The danger of shock when cleaning or changing the electrodes is eliminated. The tester is also readily transferable from one solution to another thus speeding up the testing procedure. Numerous other advantages will be obvious to those skilled in the art.

It should be understood that changes and variations may be made without departing from the spirit and scope of the invention as defined in the appended claim.

We claim:

A portable conductivity testing device for testing the electrical conductivity of liquids comprising a hollow paddle-shaped base having a handle integrally attached thereto, an electric lamp bulb attached to the upper face of the base, a dipole switch attached to the upper face of the base within reach of the hand when holding the handle, an elongated slot in the under face of the base transverse to the axis of the handle, two electrode receiving means mounted in the slot adjustably toward and away from each other, electrodes removably mounted in the electrode receiving means and extending outwardly from the base, an electric circuit connecting the electric lamp bulb, dipole switch and electrode receiving means positioned internally of the base, and means in the handle for connecting the circuit to a power source.

References Cited in the file of this patent

UNITED STATES PATENTS

| Number | Name | Date |
|---|---|---|
| 1,610,563 | McIlvaine | Dec. 14, 1926 |
| 1,996,063 | Corkran | Apr. 2, 1935 |
| 2,163,475 | Tomalis | June 20, 1939 |
| 2,461,111 | Flinspach et al. | Feb. 8, 1949 |
| 2,476,943 | Brady | July 19, 1949 |
| 2,582,629 | Hilton | Jan. 15, 1952 |
| 2,587,771 | Schoenbaum et al. | Mar. 4, 1952 |